United States Patent

Long et al.

Patent Number: 5,636,951
Date of Patent: Jun. 10, 1997

[54] PALLET RETAINER

[76] Inventors: Thomas G. Long, 239 Avon Rd., Upper Darby, Pa. 19082; Ivan Gaster, 201 Richard Ct., Union, Ohio 45322

[21] Appl. No.: 529,684

[22] Filed: Sep. 18, 1995

[51] Int. Cl.⁶ .................................... B60P 7/08
[52] U.S. Cl. .................. 410/85; 410/77; 410/80; 410/94; 410/101
[58] Field of Search .................... 410/46, 77, 80, 410/85, 94, 101, 106; 248/188.2, 357, 499, 500, 351; 24/68 CD; 108/51.1

[56] References Cited

U.S. PATENT DOCUMENTS

| | | |
|---|---|---|
| 999,828 | 8/1911 | McNaughton . |
| 2,461,767 | 2/1949 | Peyton . |
| 2,609,761 | 9/1952 | Clark ........................ 410/101 |
| 3,365,221 | 1/1968 | Jureit ........................ 410/156 X |
| 3,399,921 | 9/1968 | Trost et al. ............... 410/80 X |
| 3,685,460 | 8/1972 | Steele, Jr. et al. . |
| 3,972,500 | 8/1976 | Johnson et al. ........... 410/85 |
| 4,147,112 | 4/1979 | Green et al. . |
| 4,317,645 | 3/1982 | Van Gompel .............. 410/94 |
| 4,338,053 | 7/1982 | Abel ............................ 410/94 |
| 4,756,651 | 7/1988 | Van Gompel et al. ..... 410/46 |
| 4,842,460 | 6/1989 | Schlesch ..................... 410/121 |

*Primary Examiner*—Karen B. Merritt
*Assistant Examiner*—Stephen Gordon
*Attorney, Agent, or Firm*—Reuben Wolk

[57] ABSTRACT

A pallet retainer for securing a load on a pallet within a cargo container is monolithic and has upper and lower arms. The arms are placed under and over a transverse member of the pallet and the retainer is secured to the floor of the cargo container by various means to prevent forward and aft shifting. The upper arms may be bifurcated into two transversely spaced segments to retain the vertical members of the pallet and prevent transverse shifting.

9 Claims, 2 Drawing Sheets

PALLET RETAINER

BACKGROUND OF THE INVENTION

The present invention relates to a retainer used to secure a load supporting pallet within a cargo container. The retainer has upper and lower arms which are placed over and under the transverse member of the pallet, and the retainer is then secured to the floor of the container to secure the pallet in place.

PRIOR ART STATEMENT

Various means have been employed to secure a cargo mounted on a pallet, preferably by using L-shaped members whose horizontal components are placed or locked against the cargo container floor, and the vertical components contact the cargo itself. Examples are shown in the following patents:

McNaughton U.S. Pat. No. 999,828
Peyton U.S. Pat. No. 2,461,767
Green U.S. Pat. No. 4,147,112
Van Gompel U.S. Pat. No. 4,317,645
Schlesch U.S. Pat. No. 4,842,460

It is also known to provide a block assembly formed of an S-shaped spring member having a spacer for securing the transverse pallet member, as disclosed by Steele Jr., et al, in U.S. Pat. No. 3,685,460.

SUMMARY OF THE INVENTION

The present invention provides for a pallet retainer which is monolithic and made of a strong, lightweight material capable of withstanding repeated impacts from cargo or tools without sustaining damage, The retainer is durable and thus re-usable for an indefinite period of time, The design facilitates simple installation to a variety of pallet loads and is capable of mounting to various types of container floors.

The novel retainer is formed of a body which is split into parallel upper and lower arms that are vertically spaced apart a sufficient distance to permit them to grip a transverse load supporting member of the pallet. The arms terminate in free ends extending away from the body. The lower arm is beveled so that it may be easily inserted under the load supporting member of the pallet, the free end of the upper arm terminating short of the free end of the lower arm. When the retainer is in place, the arms effectively grip and clamp the pallet member, and then the retainer is mounted on the floor by various means.

The upper arm may be bifurcated to form transversely spaced segments, thus permitting these arms to be placed on either side of the vertical members, sometimes referred to as "framing runners", which provides the added advantage of minimizing any tendency of the pallet (and load) to shift in a transverse direction. The retainer is also provided with ribs or ears which extend vertically from the body, these ribs having apertures into which a pin may be placed; A strap is secured to this pin and may be passed around the upper, front and rear sides of the load to further minimize shifting.

The retainer is designed to overcome the deficiencies of earlier designs. By virtue of its simple, lightweight design, it is easy to store, handle and install this retainer than to handle the cumbersome L-shaped devices referred to above. It is also preferable to many systems in current use which utilize heavy, costly and cumbersome pieces of timber to block the loads. It also lends itself to customizing for particular needs and various pallet designss. Compared to the somewhat similar concept disclosed by Steele Jr. et al, this monolithic design is lighter and easier to handle, and is less expensive to manufacture in quantity. The beveled lower free end permits the retainer to be slid under the pallet without the need to tilt the entire load, as Steele does.

Accordingly, it is a principal object of the invention to provide a retainer for securing a loaded pallet in a cargo container.

It is a further object to provide a method of installing the retainer in conjunction with the pallet.

It is another object to furnish additional means for minimizing both fore and aft and transverse movement of the loaded pallet.

It is still another object to provide alternative means for securing the retainer to the cargo container.

These and other objects, features and details of the invention will become apparent from the embodiments presented in the following specification, drawings and claims.

DESCRIPTION OF THE PREFERRED EMBODIMENT

Figure 1:
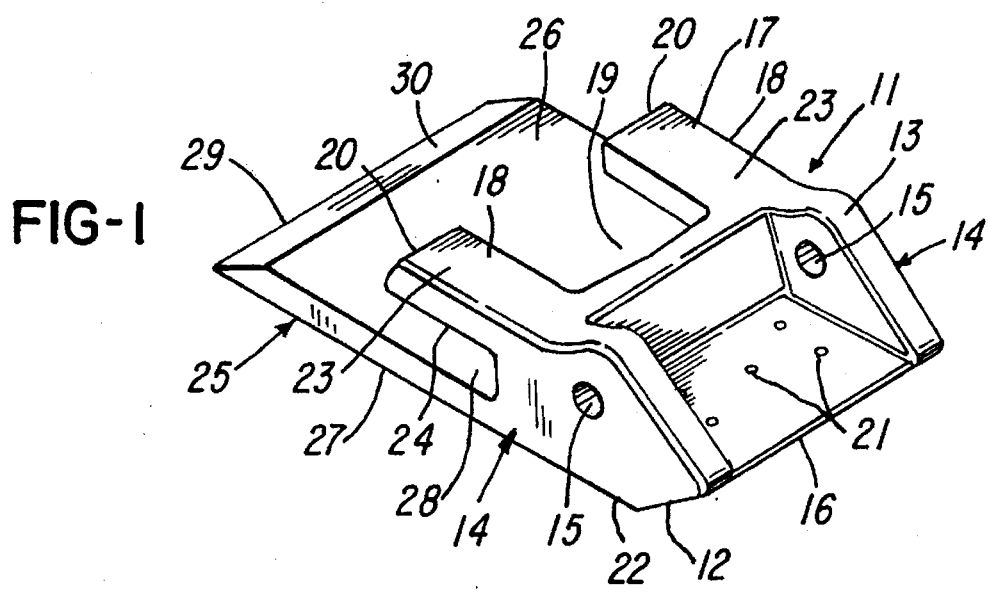
FIG. 1 is a perspective view of the novel pallet retainer.

Referring now to FIG. 1, the novel pallet retainer is designated by reference numeral 11. The retainer is monolithic, being cast or otherwise formed of a strong, lightweight high impact thermosetting plastic, a preferred material being a poly-dicyclo pentadiene; however other materials may be used. The retainer has a principal body 12, each side thereof extending outwardly and upwardly from its upper surface 13 to form identical ribs or ears 14 having apertures 15 extending therethrough. The ribs extend from an outer end 16 and angle upwardly to an upper arm 17 which extends away from the body. The upper arm is bifurcated to form arm segments 18 which define an opening 19. The arm segments terminate in free ends 20. The body has a plurality of openings 21 which extend through to the lower surface 22. The upper arm has an upper surface 23 and a lower surface 24. Also extending away from the body is a lower arm 25 which is generally parallel to the upper arm 17, and has an upper surface 26 and a lower surface 27. The upper and lower arms thus define an opening 28. The free ends 20 of the upper arm terminate short of the free end 29 of the lower arm. This free end is very thin but has a bevel 30 which extends upwardly from its lower to its upper surface at an angle between 15 and 35 degrees, the remainder of the lower arm having a constant thickness.

Figure 2:
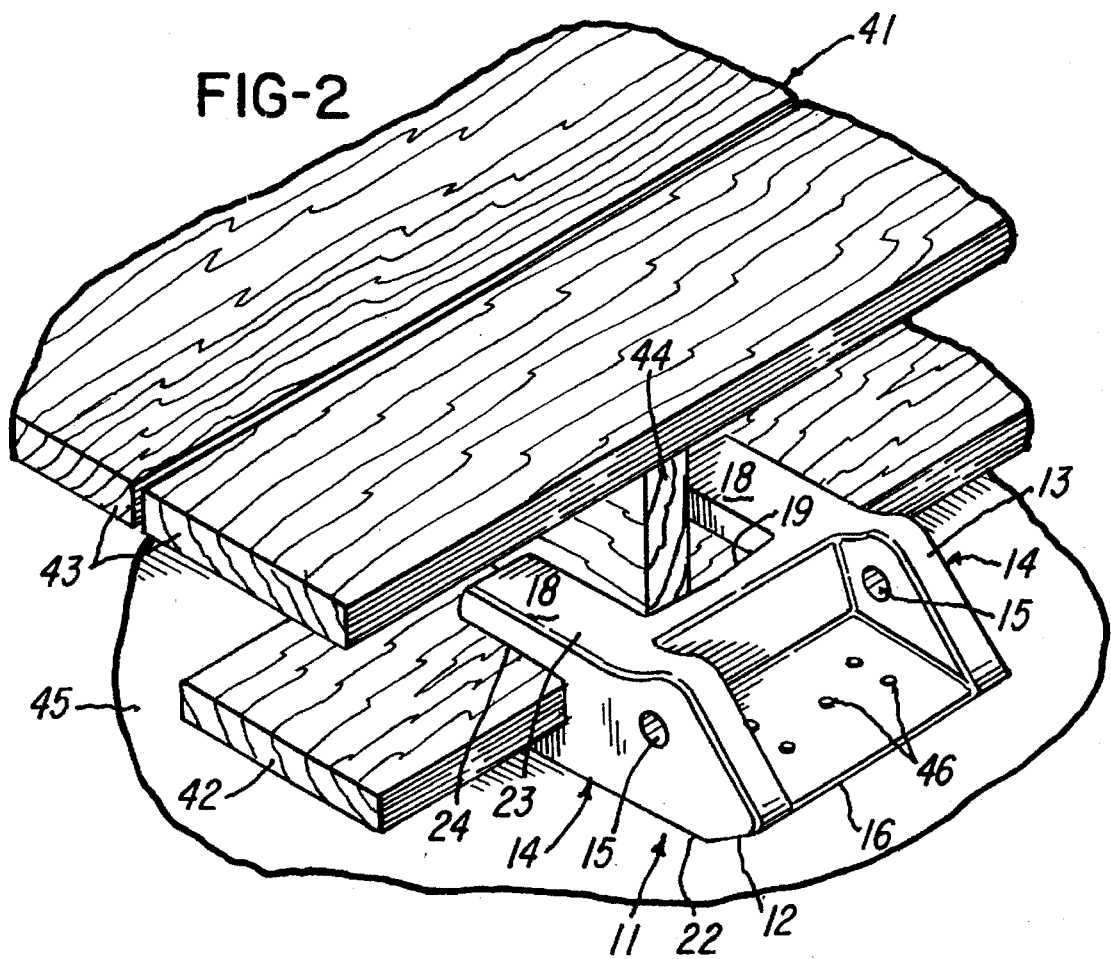
FIG. 2 is a perspective view of the novel pallet retainer shown installed.
Figure 3:
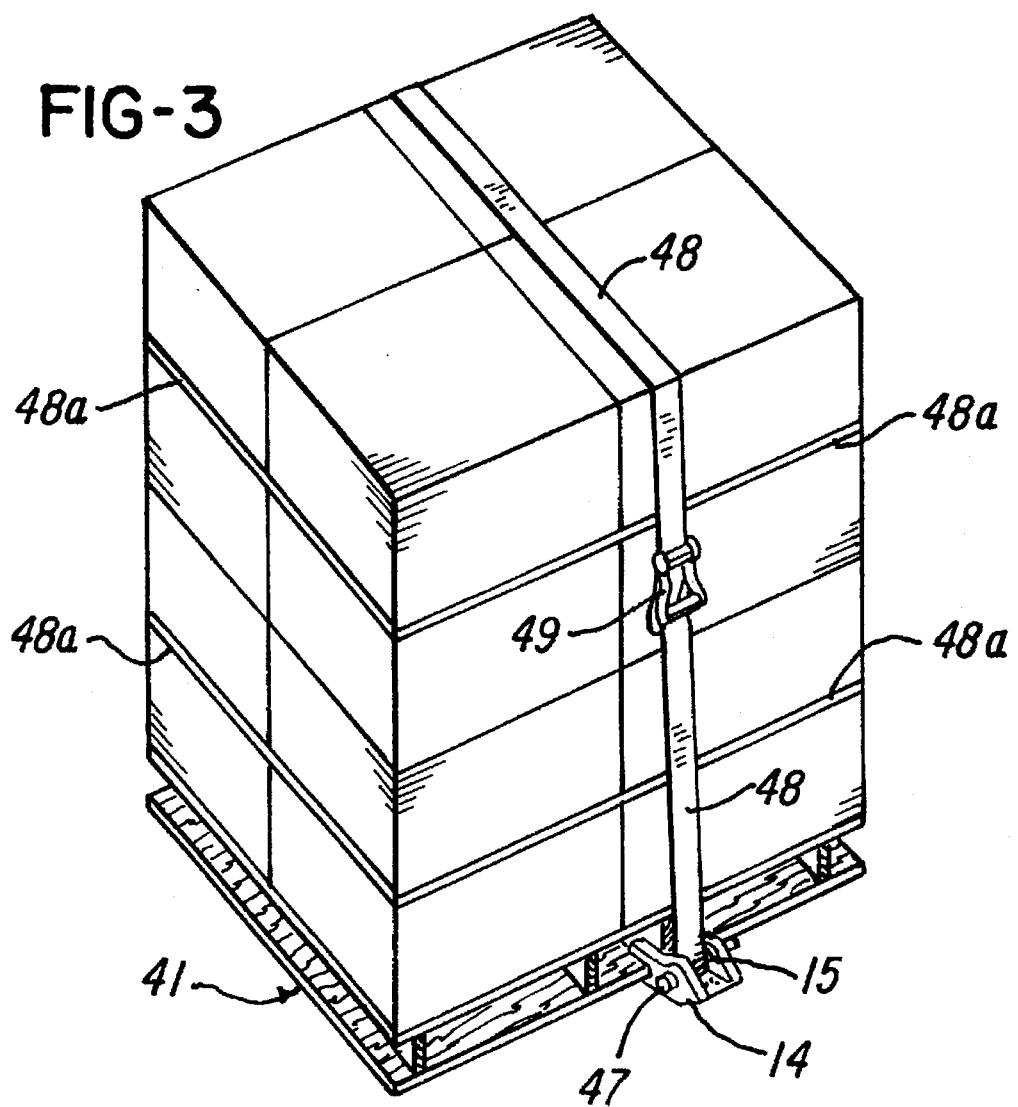
FIG. 3 is a perspective view illustrating a variation of the load retaining system utilizing the retainer and associated elements.

Installation of the retainer 11 into a system is best illustrated in FIG. 2. A typical load pallet 41 consists of a series of lower parallel transverse members 42 and a similar series of upper parallel transverse members 43 interconnected by parallel transversely spaced vertical members 44, only one of which is shown. The load is placed on the members 43, while the lower surface of members 42 contact the floor 45 of the cargo container. An overall view of the relationship among the pallet, the load, and the pallet retainer is shown in FIG. 3. The container is normally loaded with a series of pallets extending from front to rear, and the rearmost pallet is the one that is usually secured against forward and aft movement. To accomplish this, the retainer 11 is forced forwardly so that the bevel at the free end 29 of the lower arm is driven under the lower surface of member 42, thus acting as a wedge to raise the pallet off the floor by the amount of the thickness of the lower arm; approximately one fourth to one half inch. The upper surface 26 of the lower member supports the transverse member 42, and the lower surfaces of members 42 contact the floor 45 of the cargo container. An overall view of the relationship among the pallet, the load and the pallet retainer is shown in FIG. 3. The container is normally loaded with a series of pallets extending from front to rear, and the rearmost pallet is the one that is usually secured against forward and aft movement. Subsequently, the upper member 17 is driven over the upper surface of member 42, which is now securely clamped within the opening 28. The pallet and load are now secured to minimize shifting in a forward and aft direction; namely a direction at right angles to the pallet retainer.

In some load arrangements it may be important to provide additional insurance against transverse shifts. To accomplish this, the retainer is located so that the arm segments 18 straddle one of the vertical members 44, the arms thus located on both sides of the member to enclose it within the opening 19. In either of the above described installations, the retainer is secured to the floor of the cargo container by driving fasteners such as nails 46 through the openings 21 and into the floor. Double-headed nails are preferred for easy removal. Also, screws may be substituted for nails.

Frequently a cargo load may consist of products which are hard to handle, such as wire coils or metal ingots. In addition some loads may be top-heavy. The novel pallet is designed to accomodate such loads. As shown in FIG. 3, this is accomplished by placing a pin 47 through the apertures 15 in the ribs 14. A holding strap 48 is placed around the pin and passed around the front, top and rear of the load and secured by latch mechanism 49. A typical mechanism may be a conventional rachet device which simplifies tightening of the strap against the load. As shown in the drawing, supplemental straps 48a may also be utilized to secure the load.

Modification

Figure 4:
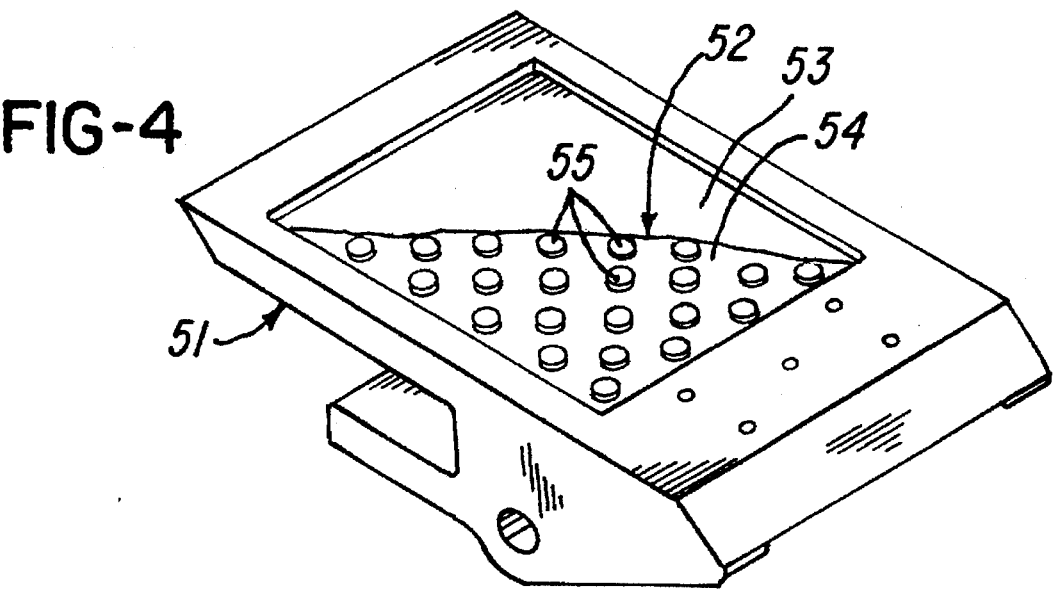
FIG. 4 is a perspective view of the bottom of the pallet retainer illustrating a modification of the securement to the container floor.

In lieu of the above fastening arrangement, the pallet may be secured by other arrangements. An example is shown in FIG. 4, illustrating a retainer 51 having a grip pad 52 secured to its lower surface 53. The grip pad consists of a flat steel sheet 54 having spaced steel discs 55. After the retainer is installed as previously discussed, vertical pressure is applied to the retainer to cause the members 55 to grip the floor. In the event the cargo container floor is made of steel instead of wood, the sheet 54 and the discs 55 are made of rubber to provide a squeegee-like locking action against the floor.

The above discussion has dealt with a single pallet retainer; however it should be understood that a plurality of such retainers are normally utilized. These retainers will be transversely spaced along the pallets in the quantity dictated by the weight and type of cargo on the pallets. Other embodiments are contemplated within the scope of the invention, it being understood that the devices illustrated and described herein are merely exemplary.

We claim:

1. In a pallet and load retention system within a cargo container including a floor, wherein said pallet comprises a plurality of transverse load supporting members and transversely spaced vertical members extending upwardly therefrom; a monolithic pallet retainer for bracing said pallet comprising a principal body having vertically spaced generally parallel upper and lower members each having upper and lower surfaces and extending away from said body and terminating in free ends, said lower member having integral means enabling said member to be placed under one of said load supporting members, said integral means including a bevel extending upward from said lower surface of said lower member in a direction toward said upper member at an angle of between 15 and 35 degrees, said upper and lower members adapted to secure said load supporting member.

2. The pallet retainer of claim 1 wherein said upper member is bifurcated to form transversely spaced segments adapted to be placed on opposite sides of one of said vertical members.

3. The pallet retainer of claim 1 including means for securing said retainer to said floor.

4. The pallet retainer of claim 3 wherein said securing means are nails.

5. The pallet retainer of claim 3 wherein said securing means comprises a grip pad on said lower surface member.

6. The pallet retainer of claim 5 wherein said grip pad is rubber.

7. The pallet retainer of claim 6 wherein said grip pad is metal.

8. In a pallet and load retention system within a cargo container including a floor, wherein said pallet comprises a plurality of transverse load supporting members and transversely spaced vertical members extending upwardly therefrom; a monolithic pallet retainer for bracing said pallet comprising a principal body having vertically spaced generally parallel upper and lower members each having upper and lower surfaces and extending away from said body and terminating in free ends, said lower member having integral means enabling said member to be placed under one of said load supporting members, said upper and lower members adapted to secure said load supporting member, said pallet retainer further comprising means for attaching strapping members thereto, said strapping members adapted to secure said pallet and said load, said attaching means comprising a plurality of ribs extending from said body, said ribs including apertures, said attaching means further comprising a locking pin inserted in said apertures.

9. The pallet retainer of claim 5 wherein said strapping members are secured to said pin.

* * * * *